(12) United States Patent
Li et al.

(10) Patent No.: US 6,921,216 B1
(45) Date of Patent: Jul. 26, 2005

(54) METHOD OF FUSION SPLICING THERMALLY DISSIMILAR GLASS FIBERS

(75) Inventors: Weijiong Li, Tucson, AZ (US); Arturo Chavez-Pirson, Tucson, AZ (US); Eugene Merzlyak, Tucson, AZ (US); Gary Paysnoe, Tucson, AZ (US); Bryan Steward, Tucson, AZ (US); Wenyan Tian, Tucson, AZ (US); Shibin Jiang, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 140 days.

(21) Appl. No.: 10/637,932

(22) Filed: Aug. 8, 2003

Related U.S. Application Data

(63) Continuation-in-part of application No. 10/374,001, filed on Feb. 25, 2003, and a continuation-in-part of application No. 09/963,727, filed on Sep. 26, 2001, now Pat. No. 6,705,771.

(51) Int. Cl.[7] .............................................. G02B 6/255
(52) U.S. Cl. ....................... 385/96; 385/98; 219/121.13; 65/501
(58) Field of Search ................ 385/96, 98; 219/121.13; 65/501

(56) References Cited

U.S. PATENT DOCUMENTS

| | | | |
|---|---|---|---|
| 3,615,312 A | 10/1971 | Landry et al. ................ 65/4 |
| 4,957,343 A | * 9/1990 | Sato et al. ................... 385/96 |
| 5,560,760 A | 10/1996 | Toeppen ...................... 65/407 |
| 5,649,040 A | 7/1997 | Ljungqvist et al. ........... 385/95 |
| 6,186,675 B1 | * 2/2001 | Ruegenberg ................. 385/96 |
| 6,244,757 B1 | 6/2001 | Kim et al. ................... 385/96 |
| 6,289,027 B1 | 9/2001 | Lawrence et al. ............ 372/6 |
| 6,726,378 B2 | * 4/2004 | Suzuki ........................ 385/96 |
| 2001/0047668 A1 | 12/2001 | Ochiai et al. ................. 65/407 |
| 2002/0164132 A1 | 11/2002 | Tian et al. .................... 385/98 |
| 2003/0081915 A1 | * 5/2003 | Fajardo et al. ............... 385/96 |

FOREIGN PATENT DOCUMENTS

WO     WO 90/07134     6/1990     ........... G02B/6/255

OTHER PUBLICATIONS

Adam E. Barnes et al., Sapphire Fibers: Optical Attenuation and Splicing Tecniques, Applied Optics, Oct. 20, 1995, pp. 6855 to 6858, vol. 34, No. 30.

Yutaka Kuroiwa et al., Fusion Spliceable and High Efficient Bi2O3–based EDF for Short–length and Broadband Application Pumped at 1480 nm., pp. TuI5–1 to TuI5–3, 2000 Optical Society of America.

Naoki Sugimoto et al., C+L Band Amplifying Properties in Short–length Bismuth Oxide Based Erbium Doped Fibers.

Asahi Glass Company, Technical Bulletin Bismuth–based EDF, —A Broadband, High Efficiency and Compact EDF, Technical bulletin rev. 2.22, Feb. 23, 2000, pp. 1 to 17.

W. H. Loh et al., Single–sided Output Sn/Er/Yb Distributed Feedback Fiber Laser, Appl. Phys. Letter 69 (15), Oct. 7, 1996, pp. 2151 to 2153, 1996 American Institute of Physics.

(Continued)

Primary Examiner—Akm Enayet Ullah
Assistant Examiner—Daniel Petkovsek
(74) Attorney, Agent, or Firm—Eric A. Gifford

(57) ABSTRACT

Thermally dissimilar glass fibers are fusion spliced by pretreating the cleaved end surface of the high-temperature fiber to provide a smooth surface for making good contact with the low-temperature fiber. The fibers are heated to a temperature that is high enough to soften the low-temperature fiber but not the high-temperature fiber and brought in contact to form the fusion joint.

25 Claims, 13 Drawing Sheets

OTHER PUBLICATIONS

H.Y. Tam, Simple Fusion Splicing Technique for Reducing Splicing Loss Between Standard Singlemode Fibres and Erbium–doped Fibre, Electronics Letters, Aug. 15, 1991, pp. 1597 to 1599, vol. 27, No. 17.

B. B. Harbison et al., Fusion Splicing of Heavy Metal Fluoride Glass Optical Fibres, Electronics Letters, 1989, vol. 25, No. 18.

L. Rivoallan et al., Fusion Splicing of Fluoride Glass Optical Fibre with CO2 Laser, Electronics Letters, May 12, 1988.

Tetsuya Miyazaki et al., Nd–Doped Double–Clad Fiber Amplifier at 1.06 um, Journal of Lightwave Technology, Apr. 1998, pp. 562 to 566, vol. 16, No. 4, 1998.

Wenxin Zheng, Real Time Control of Arc Fusion for Optical Fiber Splicing, Journal of Lightwave Technology, Apr. 1993, pp. 548 to 553, vol. 11, No. 4, 1993.

Wenxin Zheng et al., Erbium–Doped Fiber Splicing and Splice Loss Estimation, Journal of Lightwave Technology, Mar. 1994, pp. 430 to 435, vol. 12, No. 3, 1994.

K. Egashira et al., Optical Fiber Splicing with a Low–power CO2 Laser, Applied Optics, Jun. 1977, pp. 1636 to 1638, vol. 16, No. 6.

A. Berg et al., Arc Fusion Splices with Improved Strength (4.8 GPa) Approaching the Strength of the Fibre, Electronics Letters, Dec. 15, 1994, IEE 1995.

D. L. Bisbee, Splicing silica fibers with an electronic arc, Applied Optics, Mar. 1976, vol. 15, No. 3.

* cited by examiner

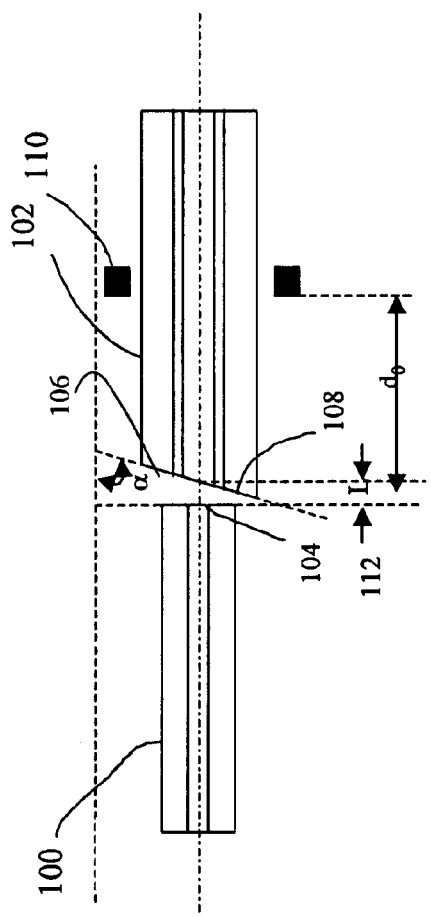
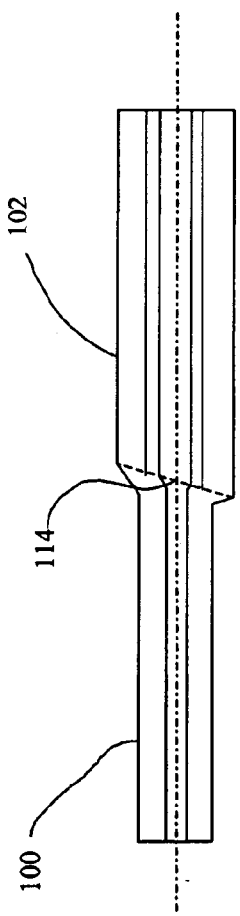
FIG. 8a
FIG. 8b

Comparison of Gain and Signal Instability

| Sample type | Sample ID | Instability 1535nm, +/- dB | Gain 1535 nm, dB | Gain 1550nm, dB |
|---|---|---|---|---|
| Cleaved DC3 | E-006 | 0.02/0.03/0.02 | 23 | 12.8 |
| Polished DC3 | 013103A | 0.03/0.02 | 22.2 | 12.1 |
| | 020303 | 0.04/0.03/0.04 | 22.6 | 12.6 |
| Premelted DC3 | 012703C | 0.02 | 22.8 | 12.8 |
| | 012703D | 0.02/0.03/0.03 | 22.8 | 12.8 |
| Note: Data with slashes indicate multiple measurements | | | | |

FIG. 14

METHOD OF FUSION SPLICING THERMALLY DISSIMILAR GLASS FIBERS

CROSS-REFERENCE TO RELATED APPLICATIONS

This application is a continuation-in-part of application Ser. No. 09/963,727 entitled "Method of Fusion Splicing Silica Fiber with Low-Temperature Multi-Component Glass Fiber" filed on Sep. 26, 2001, now U.S. Pat. No. 6,705,771 and is a continuation-in-part of Ser. No. 10/374,001 entitled "Method of Angle Fusion Splicing Silica Fiber with Low-Temperature Non-Silica Fiber" filed on Feb. 25, 2003 the entire contents of which are incorporated by reference.

BACKGROUND OF THE INVENTION

1. Field of the Invention

The present invention relates to the field of fusion splicing optical fibers, and more specifically, to the fusion splicing of thermally dissimilar glass fibers, that is glass fibers with substantially different softening temperatures.

2. Description of the Related Art

In the field of fiber optics, fiber splicing is a well-known and widely practiced technique. Typically, the fibers are brought close to each other and aligned so that their cores are coaxial with each other. Heat is transferred to both fiber ends by a filament around the end of the fiber or an electric arc between two electrodes that are positioned on either side of the axis of the two optical fibers. The heat is sufficient to soften the glass at the end of each of the two fibers. The optical fibers are then brought in contact and the hardening of the softened glass occurs as the temperature is lowered below the softening and glass transition temperatures to form a permanent bond between the fibers. See, for instance, D. L. Bisbee, "Splicing Silica Fibers with an Electric Arc", Applied Optics, Vol. 15, No. 3, March 1976, pp. 796–798. These techniques have been designed for and used to fuse fibers that have the same or very similar material compositions, e.g. two standard silica fibers.

In many applications, two fibers having different glass compositions and substantially different softening temperatures must be fusion spliced. Typically, a specialty fiber of some sort is being fusion spliced to a standard silica fiber. The standard fusion splicing process must be modified to accommodate the difference in softening temperatures and provide a low loss (<0.3 dB), low back reflection (<−50 dB) and mechanically reliable fusion splice. See, for instance, A. Barnes et al., "Sapphire fibers: optical attenuation and splicing techniques," Vol. 34, No. 30 Applied Optics, 20 Oct. 1995 pp. 6855–6858 discloses a capillary-tube splice technique for splicing sapphire fiber to silica fiber, Y. Kuroiwa et al., "Fusion Spliceable and High Efficiency $Bi_2O_3$-based EDF for Short-length and Broadband Application Pumped at 1480 nm," Optical Fiber Communication, Optical Society of America, February, 2001, discloses a method of fusion splicing a bismuth oxide ($Bi_2O_3$) based Er doped fiber (Bi-EDF) to a silica telecom fiber, U.S. patent application Publication No. US 2001/0047668 A1 published on Dec. 6, 2001 discloses a method of fusion splicing Bismuth based glass fibers with standard silica fibers in which the fibers are aligned with their cleaved ends in contact and then asymmetrically heated, and U.S. patent application Publication No. US 2002/0164132 A1 published on Nov. 7, 2002 discloses heating the end of the fiber of lower melting point by conduction from the pre-heated end of the fiber of higher melting point.

Formation of a mechanically sound joint between thermally dissimilar fibers without degrading optical performance remains an elusive problem. Present techniques focus on optimizing the fusion splicing parameters, e.g. temperature and time, and post-treatment of the joint to improve mechanical strength. These techniques are limited and often ineffective and may degrade optical performance.

SUMMARY OF THE INVENTION

In view of the above problems, the present invention provides a method of forming a mechanically sound fusion splice between glass fibers with substantially different softening temperatures without sacrificing optical performance.

The fibers are fusion spliced by heating them to a temperature that is high enough to soften the low-temperature fiber but not the high-temperature fiber. This was found to be a necessary condition to avoid seriously degrading if not destroying the low-temperature fiber. However, cleaving damages the high-temperature fiber and leaves a rough cut or twisted surface. The problem is particularly acute in double-clad fiber at the interface between the cladding layers. Because the high-temperature fiber is not softened, these imperfections remain and produce or exacerbate macro and/or micro cracks at the fusion joint due to imperfect contact, hence ineffective thermal diffusion between the two fibers. The problem is overcome by pretreating the cleaved end of the high-temperature fiber to form a flat smooth surface. The fiber is polished using a fire-polishing technique near its softening temperature or a mechanical-polishing technique.

In one embodiment, the high-temperature fiber is a single or double-clad silica fiber and the low-temperature fiber is a single or multi-clad multi-component glass fiber. The fibers may be angle or square cleaved.

In another embodiment, the fibers are asymmetrically heated so that the temperature at the end of the high-temperature fiber is greater than the temperature at the end of the low-temperature fiber. This temperature gradient serves to improve thermal diffusion between the two fibers when brought into contact thereby strengthening the fusion splice. Asymmetric heating is achieved by placing the heating element along the high-temperature fiber at a distance $d_o$ from the splice so that the temperature is highest at a point on the high-temperature fiber away from the fiber tip. The heat is preferably localized onto the high-temperature fiber, which reduces the direct heating of the low-temperature fiber, to maximize the temperature gradient and increase bond strength.

In another embodiment, the high-temperature fiber is angle cleaved and the low-temperature fiber is square cleaved. The end of the low-temperature fiber forms a matched angle in situ during the splicing process. This method avoids angle cleaving of the low-temperature fiber and the alignment of two angle-cleaved fibers, which are low yield and time consuming processes. In another embodiment, the tip of the angle-cleaved fiber is polished flat back to the core to reduce the range of motion of the low-temperature fiber during splicing. In yet another embodiment, the low-temperature fiber is provided with an outer cladding layer that is chemically and thermally compatible with both the low and high temperature glasses.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 8a–8b are diagrams illustrating asymmetric heating of angle-cleaved fiber;

FIG. 14 is a table of gain instability data; and

DETAILED DESCRIPTION OF THE INVENTION

Figure 1:
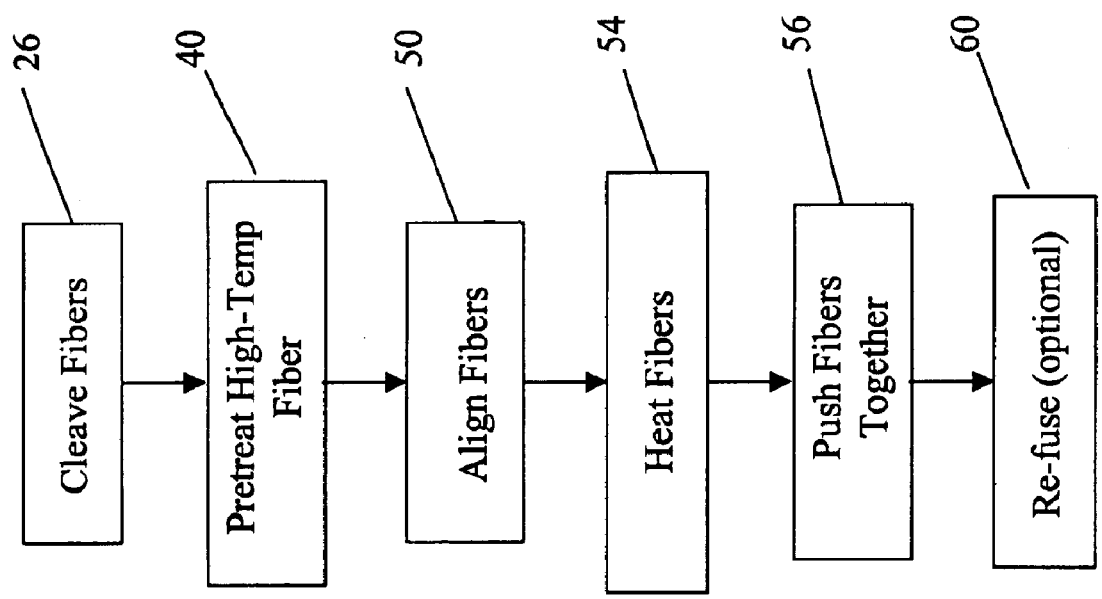
FIG. 1 is a flowchart of a method of fusion splicing thermally dissimilar fibers in accordance with the present invention.

The present invention provides a mechanically robust fusion splice between a high-temperature fiber and a specialty low-temperature glass fiber. This type of fusion splice is particularly useful in and was motivated by the development of compact optical components such as fiber amplifiers and lasers. To eliminate fiber management and reduce package size one must use a glass fiber that provides high gain per unit length. This in turn dictates a glass such as a multi-component glass (phosphorus oxide $P_2O_5$, germanium oxide $GeO_2$ or telluride oxide $TeO_2$) that has a high solubility of rare-earth dopants such as erbium and ytterbium and exhibits the necessary spectroscopic properties. These glasses have a much lower softening point temperature than standard silica glass.

To avoid seriously degrading if not destroying the multi-component glass fiber when spliced to the silica fiber, it was determined through extensive testing that a lower splice temperature sufficient to soften but not damage the multi-component glass fiber was required. Standard Silica-to-Silica fibers are spliced above 1600° C. whereas the Silica-to-Multi-Component fibers are typically spliced at less than 1000° C.

Further experimentation showed that the fusion joint formed at this lower temperature was relatively weak and exhibited a low yield. Adequate "pull-strengths" are required for a fiber chain to survive handling, packaging and storage and to perform reliably over extended lifetimes. The problem could not be overcome by raising the splice temperature to soften the silica fiber because of damage to the multi-component glass fibers. Standard techniques of optimizing the fusion splice parameters or post treatment of the joint were ineffective.

Inspection of the fusion joint revealed that the cleaved end surfaces of the fibers were making imperfect contact. Surface profile interferometry measurements were conducted to correlate surface quality of the silica fiber to the pull strength of the splices. From this data it was determined that poor surface quality of the silica fiber was highly correlated to low mechanical strength of the fusion joint. The lower splice temperature was insufficient to soften the silica fiber and smooth its end surface damaged during cleaving, which leaves a rough cut, curved, twisted and cracked surface. The problem is particularly acute in double-clad fiber at the interface between the cladding layers. The remaining rough cut and/or twisted curved surface can easily produce macro or micro cracks at the fusion joint due to imperfect contact. The cracks produce external and internal mechanically weak points at the joint that inhibit effective thermal diffusion between the two dissimilar fibers, thus weakening the joint.

The problem was overcome by pretreating the cleaved end of the high-temperature fiber to form a smooth surface. The fiber is polished using a fire-polishing technique near its softening temperature or a mechanical-polishing technique. As a result, the two fibers form near perfect contact which enables effective thermal diffusion and a mechanically strong joint without degradation of optical performance.

Although the method of pretreating the high-temperature fiber to improve fusion splicing is generally applicable to any thermally dissimilar fibers, square or angle cleaved, single or multi-clad, the invention will now be described in the context of fusion splicing a specialty multi-component glass fiber to a commercial silica fiber.

Standard single mode fiber (SMF) includes a core and a cladding layer formed from silica glass (~100% $SiO_2$). A double-clad fiber (DCF) includes a second cladding layer also formed from silica glass. DCF is typically used in conjunction with multi-mode pumping schemes to couple the pump into the specialty multi-component glass fiber. SMF and DCF have softening temperatures >1200° C.

The specialty multi-component glass fiber includes a core and at least one cladding layer formed from a glass composition that contains one or more glass network formers, e.g. phosphorus oxide $P_2O_5$, germanium oxide $GeO_2$ or telluride oxide $TeO_2$, 30 to 80 weight percent, one or more glass network modifiers MO (alkaline-earth oxides and transition metal oxides such as BaO, CaO, MgO, Sro, ZnO, PbO and mixtures thereof) 2 to 40 weight percent and one or more glass network intermediators $L_2O_3$ ($Y_2O_3$, $La_2O_3$, $Al_2O_3$, $B_2O_3$ and mixtures thereof) 2 to 30 weight percent. The glass network formers are characterized by a substantial amount of non-bridging oxygen that offers a great number of dopant sites for rare-earth ions. The fiber core is then doped with high concentrations of rare-earth dopants such as erbium (0 to 5 wt. %) or co-doped with, for example, ytterbium (0 to 30 wt. %). The cladding layer(s) is (are) typically but not necessarily undoped glass. As a result, the subclass of multi-component glasses has a much lower softening temperature (<1000° C.) than silica (>1600° C.), which greatly simplifies the fiber drawing process but complicates the process of fusion splicing to silica fiber.

Figure 2:
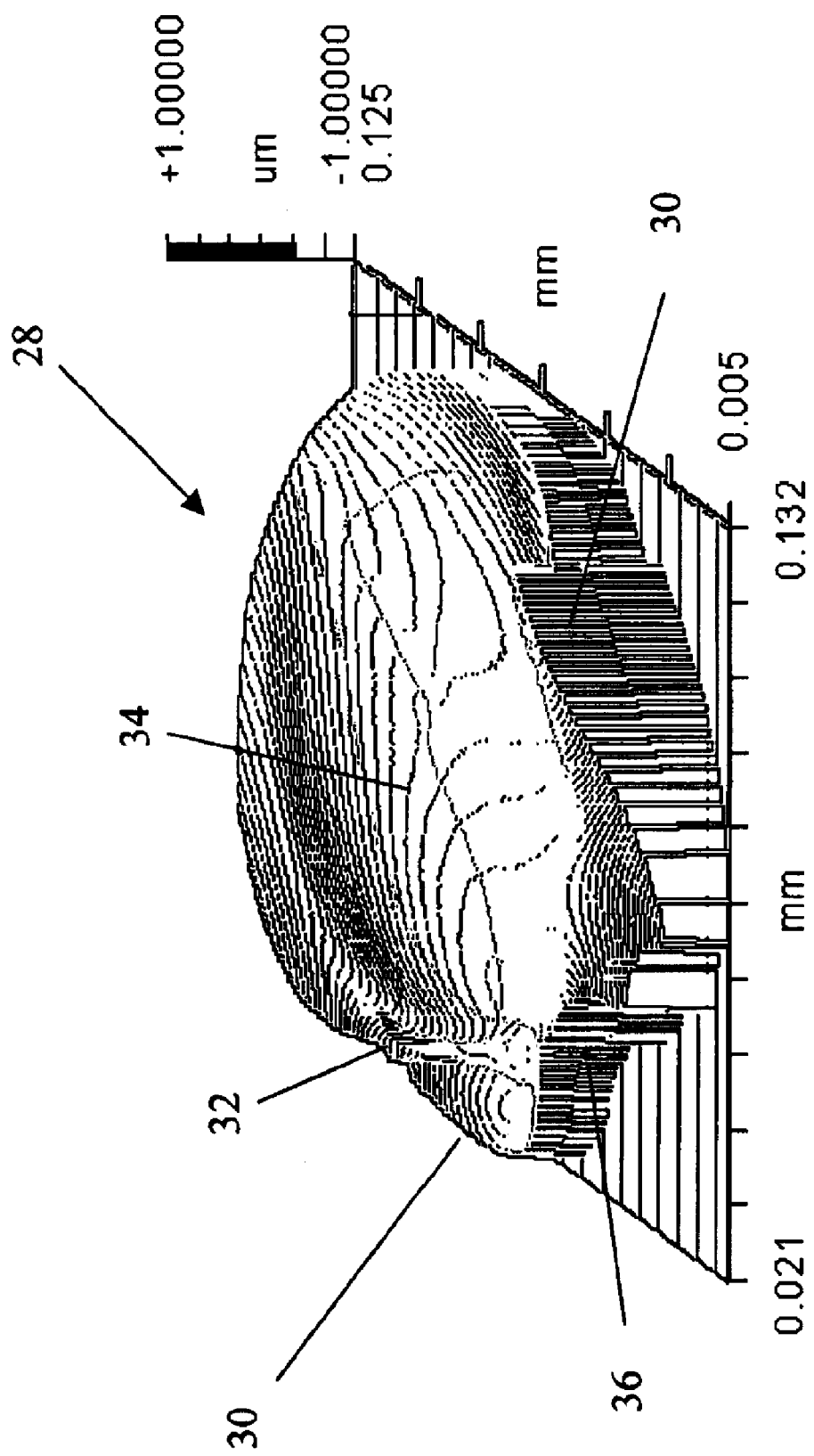
FIG. 2 is a plot of the surface profile of a cleaved DCF.

Turning now to FIGS. 1 through 5, a standard silica DCF 10 having a core 12, an inner cladding 13 and an outer cladding 14 and a specialty multi-component fiber 16 having a core 18 and a cladding 20 are angle-cleaved to form angle-cleaved end surfaces 22 and 24, respectively (step 26). Angle cleaving is employed to reduce back reflection at the fusion joint. As shown in FIG. 2, a surface profile 28 of the cleaved end surface 22 of the silica fiber 10 illustrates the nature of the damage done to the surface during cleaving. Surface profile 28 exhibits a cliff-like structure 30 at micro crack 32 at the interface of the inner and outer claddings, a generally twisted and curved surface 34 with a 2 micron peak-to-valley variation and an edge cut 36. Square-cleaved fibers have not exhibited the twist and curve damage, which appears to be an artifact of angle-cleaving. SMF is generally smoother because of the absence of the second cladding layer. However, it also tends to chip or crack at the point where the cleaver strikes the edge of the fiber. The stresses associated with the twisted and curved surface caused by angle-cleaving appear to be the most significant factor in weakening the fusion joint. However, square-cleaved SMF and DCF fiber chains exhibit marked improvement in pull-strength when pretreated.

Figure 3:
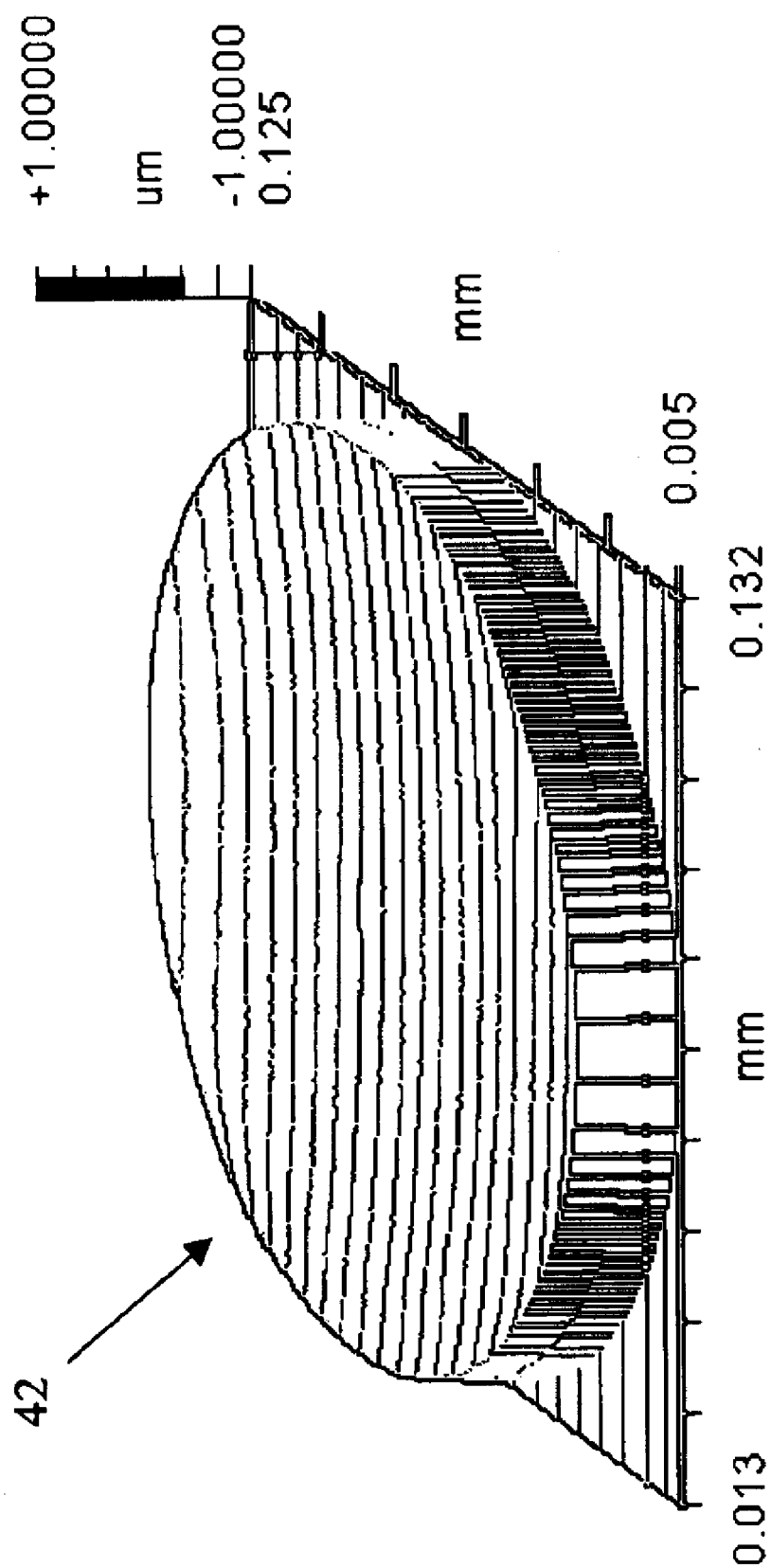
FIG. 3 is a plot of the surface profile of a cleaved DCF that has been pretreated in accordance with the present invention.

Silica fiber 10 is pretreated using a mechanical-polish or fire-polish to smooth its angle-cleaved end surface 22 (step 40). As shown in FIG. 3, a surface profile 42 of the cleaved end surface 22 shows a smooth surface in which the damage done during cleaving was removed. Polishing removes the edge cut, twist, curvature and micro and macro cracks. A well polished surface will exhibit less than a 0.1 micron peak-to-valley variation. In addition, the polished surface can be made smooth—with typical RMS surface height variation of less than 10 nm.

Figure 4:
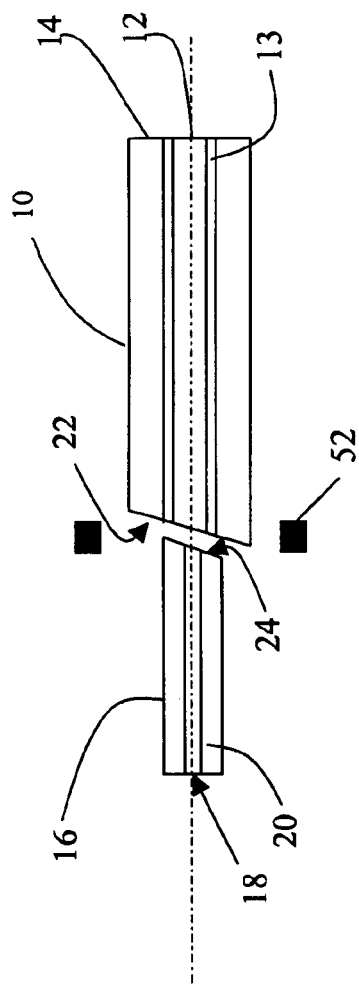
FIG. 4 is a mechanical diagram illustrating the fusion splicing process.
Figure 5:
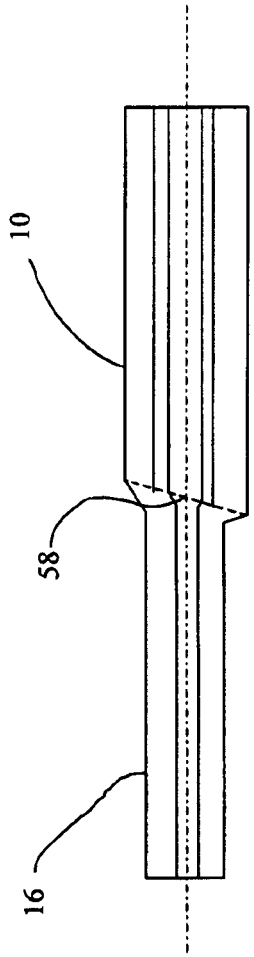
FIG. 5 is a diagram of a fusion joint.

As shown in FIG. 4, the pretreated silica DCF 10 and multi-component fiber 16 are aligned in an end-to-end configuration with a small gap separating the fibers using, for example, a Filament Fusion Splicing System, Model FFS-2000, from Vytran Corporation (step 50). Heating elements 52 are positioned on either side of or partially encircling the silica fiber 10 either at the gap or more preferably at a distance $d_o$ away from multi-component fiber 16 (see FIGS. 8 and 9 for details of asymmetric heating). The heating elements soften the specialty fiber's angle-cleaved end surface 24 but not the silica fiber 10 (step 54). Critically, the temperature is raised to a temperature above the softening temperature of the multi-component glass yet below that of silica. The optical fibers are then pushed together (step 56). The softened multi-component glass hardens as the temperature is lowered below its softening temperature to form a permanent thermally diffused fusion joint 58 between the fibers as shown in FIG. 5. An optional "re-fuse" program may be used to further reduce the loss and enhance the mechanical strength of the joint (step 60).

One pretreatment approach is to mechanically-polish the silica fiber's cleaved end surface. The flatness and smoothness of the surface can be optimized by well-known polishing techniques; moreover, the facet of the fiber can be angle polished with great precision—which is very difficult in the usual cleaving process.

Figure 6:
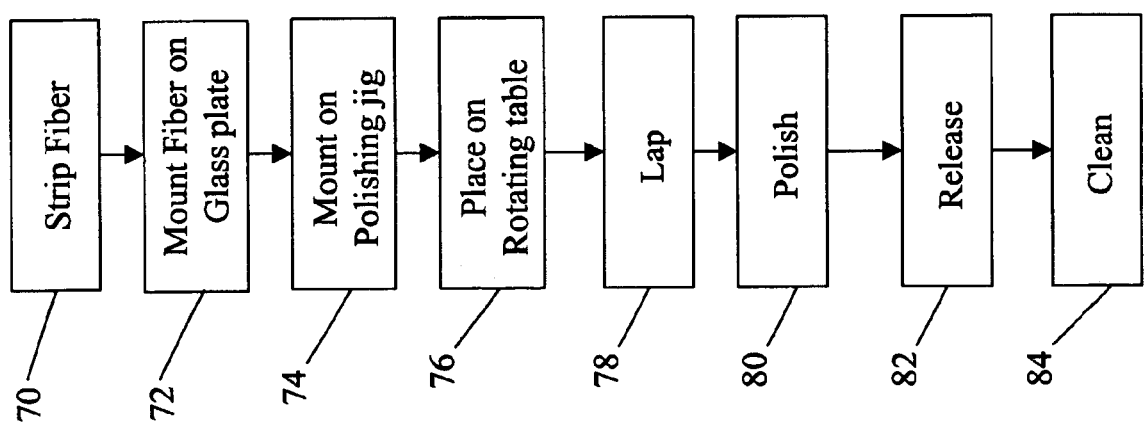
FIG. 6 is a flowchart of a mechanical-polishing process for pretreating the high-temperature fiber.

As shown in FIG. 6, optical fibers with polymer buffers are mechanically or chemically stripped of the buffer exposing a few centimeters of bare fiber and cleaned (step 70). A group of such fibers are placed on a glass plate aligning them parallel to each other and parallel to a reference edge (step 72). A second glass piece sandwiches the fibers together and the entire structure is held together with a heat sensitive adhesive material. On one end of the bonded structure the fiber facets are exposed for polishing. On the other end, the buffered fibers exit the bonded fixture and are bundled together for convenient handling.

The bonded structure is placed in a polishing jig with reference edge adjusted to produce the required angle on the fiber facets (step 74). The spinning jig is placed on a rotating polishing table (step 76). The motion of the jig and the polishing table together produce the grinding and polishing action for removal and shaping of the glass surface. The edge of the bonded structure contains a linear array of fiber facets. This surface is mechanically lapped with polishing slurry containing micron-sized particles that remove sufficient amount of material such that the edge of the bonded structure is even across entire surface (step 78). This is followed by a polishing step with finer particle slurry, which makes the bonded edge that contains the fiber facets flat and smooth (step 80).

The fiber facets are examined under optical microscope for cleanliness, and measured with an interferometer to determine the shape of the polished surface—paying special attention to the flatness and smoothness. The radius of curvature of the surface characterizes the flatness—with larger values indicating better flatness. The process typically produces a radius of curvature of greater than 5 m. The RMS smoothness of the facet surface is typically less than 10 nm.

The array of fibers is released from the bonding structure by an appropriate solvent, which dissolves the adhesive material but does not attack the fiber or the buffer materials (step 82). The bare fiber sections are thoroughly cleaned with a series of solvents—such that the polished end facet and surrounding bare fiber are completely free of residue or contamination (step 84). The finished piece consists of a polished fiber facet with a section of bare fiber a few centimeters in length followed by a long length (10's of centimeters) of unprocessed buffered fiber. The polished fiber facets are ready for fusion splicing.

Figure 7:
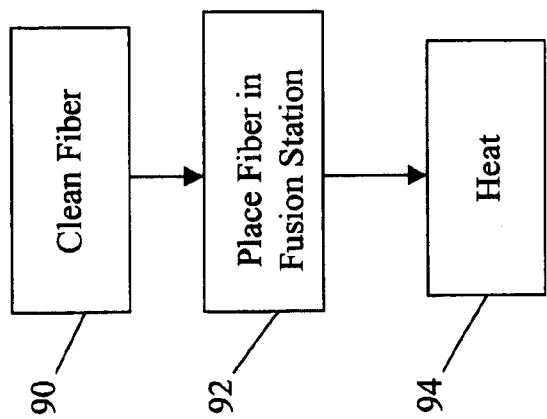
FIG. 7 is a flowchart of a fire-polishing process for pretreating the high-temperature fiber.

Another pretreatment approach is to fire-polish the silica fiber's cleaved end surface. As shown in FIG. 7, fire polishing is achieved by applying heat to the cleaved end face of the silica fiber above the fiber softening temperature, e.g., 1600° C. for silica fiber, for a period of time. Fire-polishing can be done on any fusion splicer or other heating equipment capable of applying adequate, controlled heat to the fiber end. But most conveniently, it is performed on the same fusion splicer used to do the final fusion splicing of two thermally dissimilar fibers. For example, the silica fiber is cleaned in ultrasonic bath filled with ethanol (step 90), and placed onto the fusion splicing station (step 92). The conditions for the conventional symmetrical fusion splicing of SMF to SMF (same conditions can be used for DCF to DCF) are modified by simply changing the fusion splicing time to heat the silica fiber (step 94). In a typical example, the fusion splicing power is 20.5 W and time is 0.3 s for fire-polishing (same power is used for fusion splicing two commercial silica fibers but time is much longer, say 5 s). The fire-polished silica fiber is then ready for fusion splicing.

Figure 9:
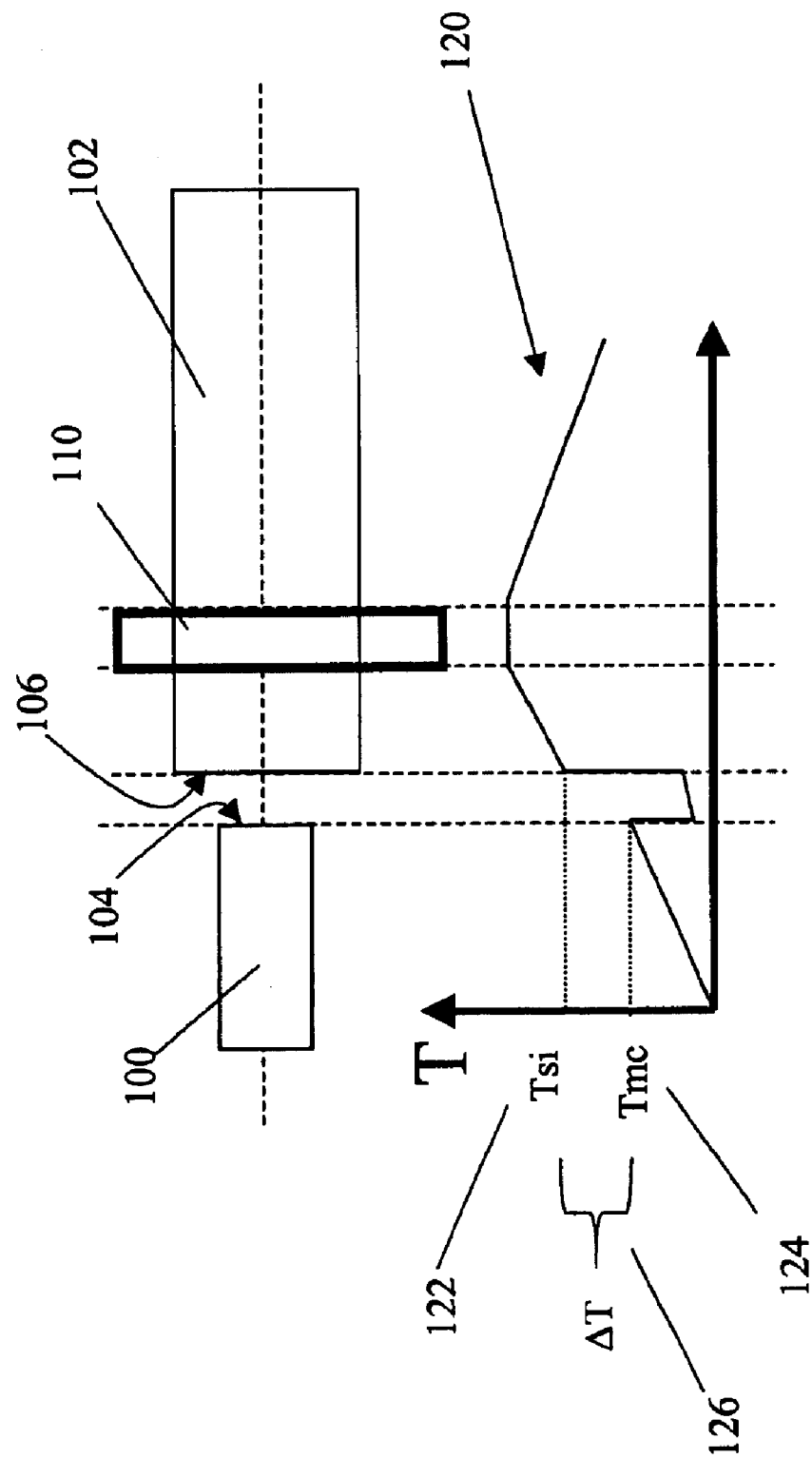
FIG. 9 is a temperature diagram illustrating the asymmetric fusion splicing process.

To further simplify the fusion splicing process and strengthen the fusion joint, the multi-component fiber can be square-cleaved and asymmetrically heated to form the fusion joint as illustrated in FIGS. 8 and 9. Because the angle-cleaved silica fiber is not softened, the softened square-cleaved multi-component fiber will form a matched angle in situ. This avoids angle cleaving of a multi-component fiber and the alignment of two angle-cleaved fibers, which are both difficult processes. Asymmetric heating creates a thermal gradient that improves thermal diffusion and strengthens the fusion joint.

A specialty multi-component glass fiber 100 is aligned and brought close to a silica fiber 102. Multi-component glass fiber 100 has been square cleaved at an approximately 90° angle to the axis of the fiber to have a flat square-cleaved end surface 104. Silica fiber 102 has been angle-cleaved at an approximately 80° to 84° angle α to the axis of the fiber and pretreated to have a smooth angle-cleaved end surface 106 with a tip 108.

A heating element 110 is positioned on either side of or partially encircling silica fiber 102 at a distance $d_o$ from gap 112, which defines a separation L between the fiber centers, away from the multi-component fiber. The heating element softens the glass at square-cleaved end surface 104 of specialty fiber 100 but not silica fiber 102. The temperature of silica fiber 102 is raised to a temperature above the softening temperature of multi-component glass fiber 100 yet below that of silica. The optical fibers are then brought in contact. A matched angle at the end of multi-component fiber 100 is generated in situ during the splicing process. The softened glass hardens as the temperature is lowered below the softening and glass transition temperatures of the specialty fiber to form a permanent thermally diffused angled fusion splice 114 between the fibers as shown in FIG. 8b.

By moving heating elements 110 away from the multi-component fiber, silica fiber 102 is brought to a higher temperature and its angle-cleaved end surface 106 acts as the heating element for the multi-component fiber 100 that is initially placed at a distance L from the end of the silica fiber and then brought into contact with the silica fiber. Since the silica fiber is at a higher temperature, the diffusion processes and chemical reaction that form the thermal diffusion bonds between the two fibers are more efficient leading to a bond with good tensile strength. Furthermore, it is believed that the use of the silica fiber to indirectly heat the multi-component glass fiber provides a more uniform heating, hence softening of square-cleaved end surface 104 thereby improving bonding strength.

FIG. 9 depicts a representative temperature profile 120 for the asymmetric configuration shown in FIG. 8. As shown the temperature is a maximum on silica fiber 102 at the position of heating element 110 and gradually decreases to a temperature 122 ($T_{si}$) at the angle-cleaved end surface 106 of the silica fiber. On the other side of air gap 112, temperature 124 ($T_{mc}$) at square-cleaved end surface 104 of fiber 100 is lower such that the temperature gradient 126, $\Delta T = T_{si} - T_{mc} > 0$. By asymmetrically heating the fibers, the end of the silica fiber can be raised to a temperature that is higher than that at the end of the multi-component glass fiber. The resulting temperature gradient between the two fibers is advantageous to get low loss and high tensile strength simultaneously. To soften the multi-component glass fiber without softening the silica fiber, the silica fiber is heated so that $T_{si\text{-}soft} > T_{si} > T_{mc} > T_{mc\text{-}soft}$ where $T_{si\text{-}soft}$ and $T_{mc\text{-}soft}$ are the softening temperatures of the silica and multi-component glass fibers.

Figure 10A:
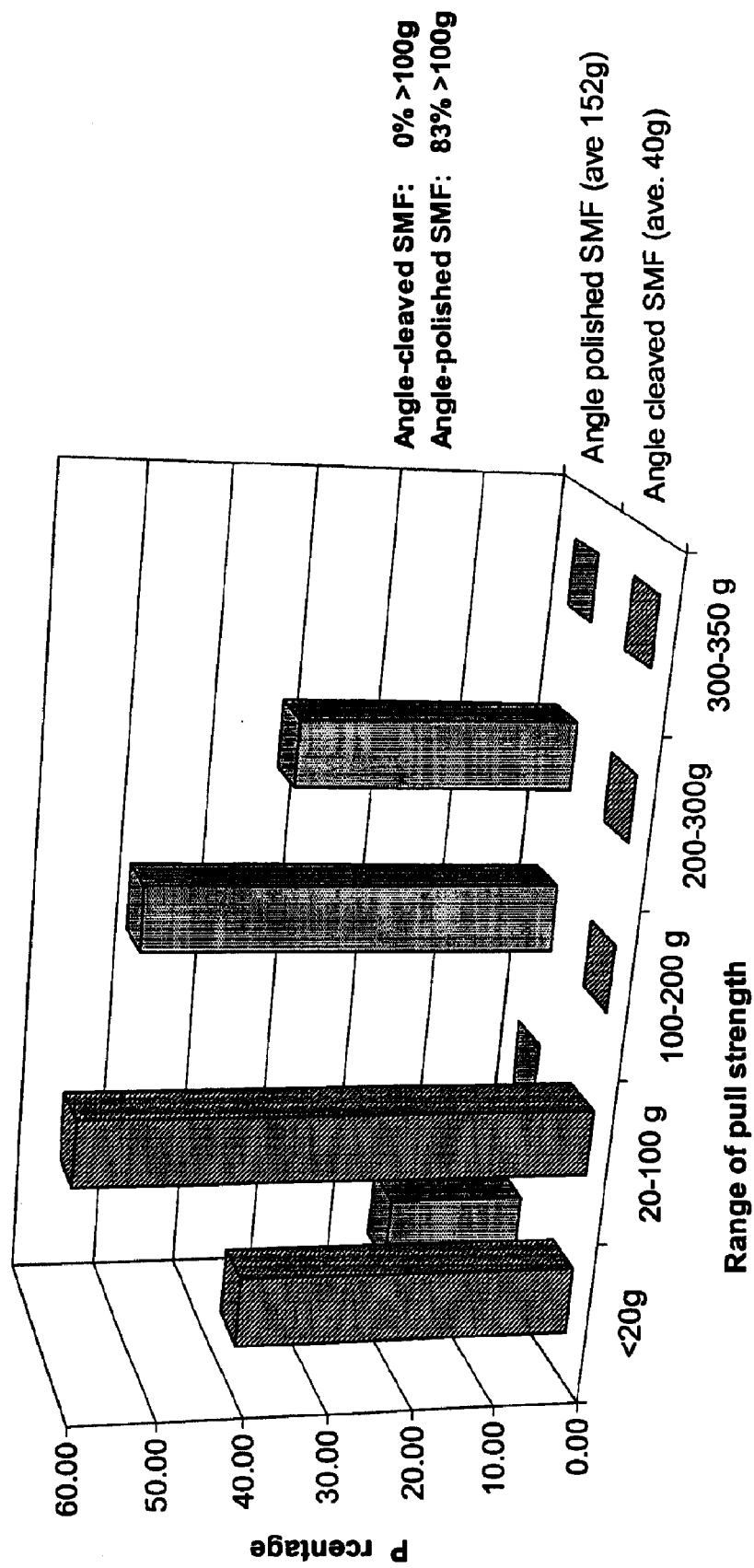
FIGS. 10a and 10b are graphs of measured pull-strength data of the fusion joint with and without pretreatment formed with asymmetric heating shown in FIGS. 8 and 9 for DCF and SMF, respectively.
Figure 10B:
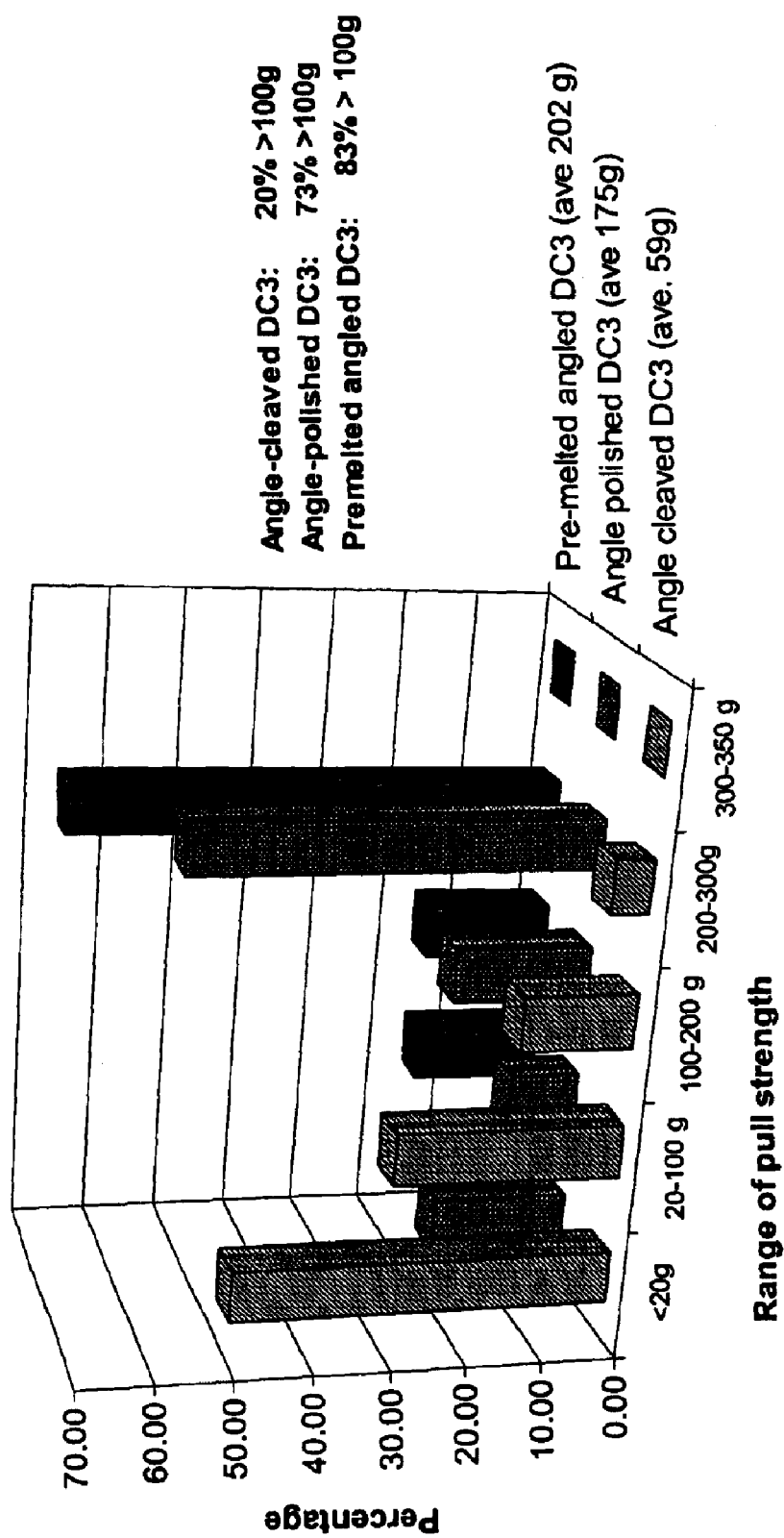

To validate the efficacy of the pretreatment process, a number of fiber chains were created using the asymmetric square-angle cleaved approach just described. Samples were created with both untreated and pretreated SMF and DCF silica fibers. The results of the pull-strength tests are shown in FIGS. 10a and 10b. As shown in FIG. 10a, the untreated SMF fiber chains had average pull strength of only 40 g with 0% exceeding 100 g. The pretreated SMF fiber chain (mechanically-polished in this test) exhibited an average pull strength of 152 g with 83% exceeding 100 g and greater than 30% exceeding 200 g. As shown in FIG. 10b, the untreated DCF fiber chains had average pull strength of only 59 g with 20% exceeding 100 g. The mechanically-polished DCF fiber chain exhibited average pull strength of 175 g with 73% exceeding 100 g and greater than 50% exceeding 200 g. The fire-polished DCF fiber chain exhibited average pull strength of 202 g with 83% exceeding 100 g and greater than 60% exceeding 200 g. It is expected that the average pull strength will increase and the distribution narrow as the procedure is refined. As a point of reference, the pull-strength of the multi-component fiber itself, hence the maximum pull-strength of the fiber chain is 299 g on average. These experiments clearly demonstrate that the practice of pretreating the silica or "high-temperature" fiber prior to fusion-splicing thermally dissimilar fibers has a substantial impact on mechanical strength and reliability of the fusion joint. This represents a major step forward in enabling the commercial use of multi-component glass fibers in optical components such as fiber lasers and EDFAs to name a few.

Figure 11:
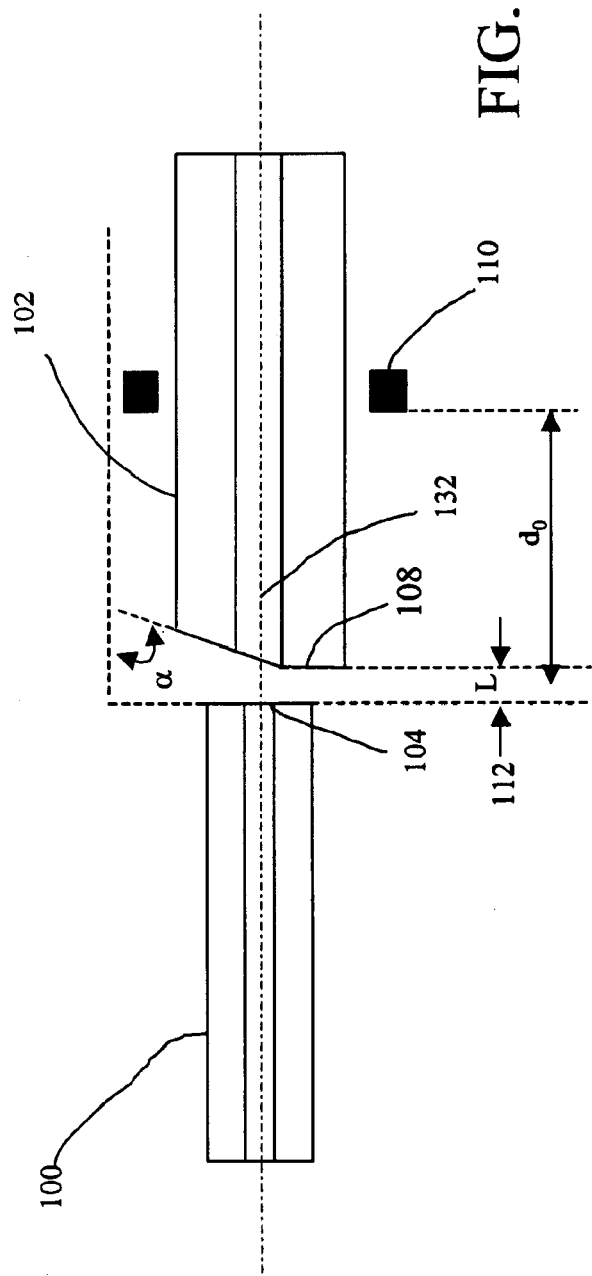
FIG. 11 is an alternate embodiment in which the tip of the silica fiber is polished back to its core.

In another embodiment shown in FIG. 11, the tip 108 of the angle-cleaved silica fiber 102 is polished flat back to the core 132 to reduce the range of motion of the silica fiber to the multi-component fiber during splicing.

Figure 12:
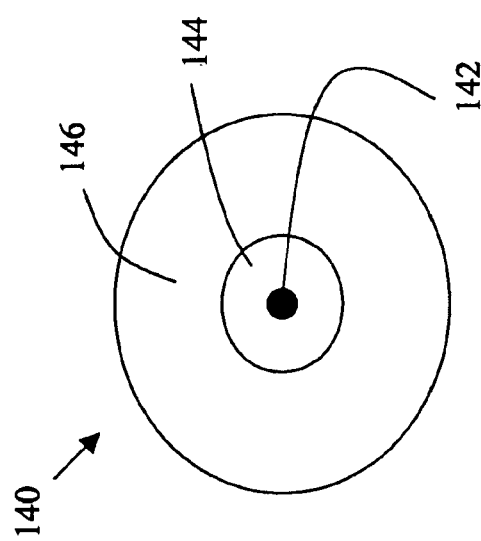
FIG. 12 is an alternate embodiment in which the multi-component glass includes an outer cladding that is compatible with both the multi-component and silica glasses.

In another embodiment shown in FIG. 12, a multi-component glass fiber 140 having a core 142 and inner cladding 144 may be drawn with a special outer cladding 146 such as silicate glass that is chemically and thermally compatible with both the multi-component and silica glasses. More specifically, the material for the outer cladding will be a different multi-component glass having a softening temperature that is higher than that of the core and inner cladding multi-component glass but close enough that the two materials can be drawn together in a fiber. The outer cladding material will also exhibit a glass network that is similar to that of silica in order to form strong thermal diffusion bonds. The use of a special outer cladding layer on the multi-component fiber may, in some cases, allow the use of a conventional symmetric angle-fusion splice with pretreatment of the silica fiber.

Figure 13:
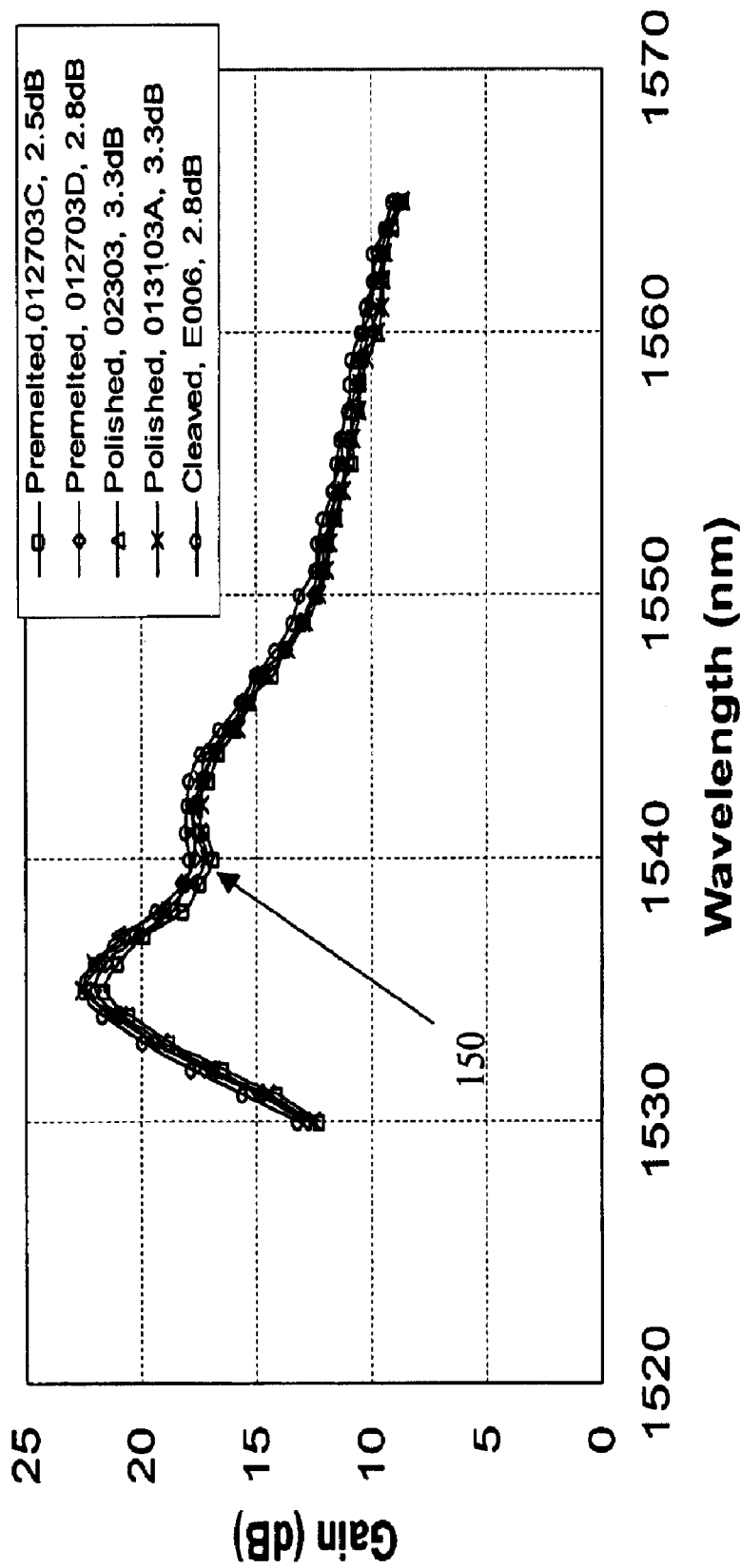
FIG. 13 is a plot of gain versus wavelength for a variety of spliced fibers.
Figure 15:
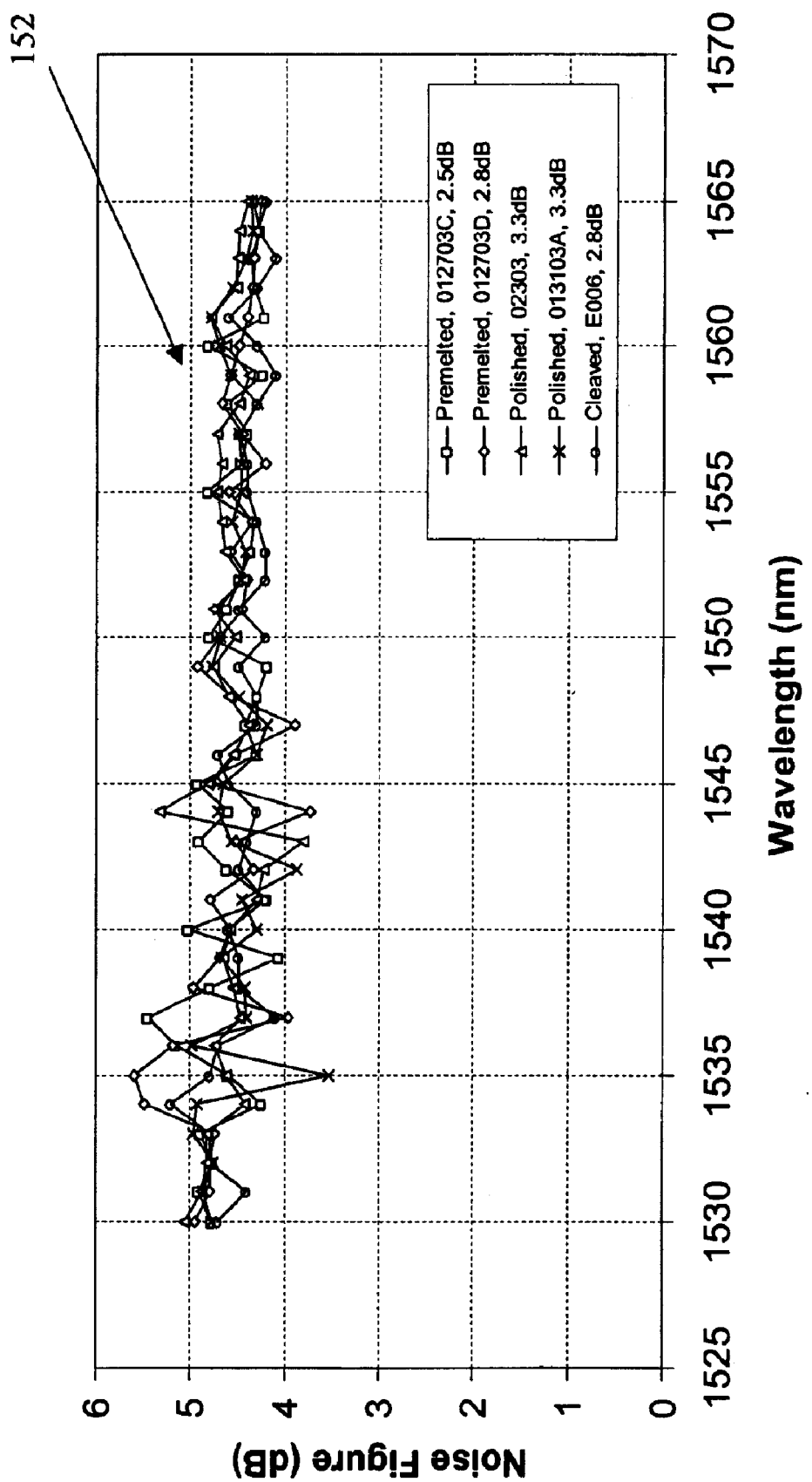
FIG. 15 is a plot of noise versus wavelength for a variety of spliced fibers.

In all cases, it is important that the fusion splicing process and specifically the pretreatment step not degrade the optical performance of the fiber chain. As shown in FIGS. 13–15 pretreatment of the silica fiber using either mechanical-polishing of fire-polishing has no measurable effect on optical performance. As shown in FIG. 13, the gain performance 150 of the fiber chain is unaffected. As shown in FIG. 14, the gain and signal stability are unaffected. As shown in FIG. 15, the noise figure 152 is unaffected.

While several illustrative embodiments of the invention have been shown and described, numerous variations and alternate embodiments will occur to those skilled in the art. For example, the invention is not limited to only low-temperature multi-component glass but can be easily applied to angle fusion splicing other low-temperature non-silica fibers such as tellurite or bismuth based glass to standard silica fiber. Such variations and alternate embodiments are contemplated, and can be made without departing from the spirit and scope of the invention as defined in the appended claims.

We claim:

1. A method of fusing optical fiber, comprising:

Providing a high-temperature fiber having a cleaved end surface;

Pretreating the high-temperature fiber to smooth the cleaved end surface;

Placing the high-temperature fiber in an end-to-end configuration with a low-temperature fiber having a cleaved end surface; and Heating the low and high-temperature fibers at a temperature between their softening temperatures to soften the cleaved end surface of the low-temperature fiber without softening the cleaved end surface of the high-temperature fiber to form a fused joint.

2. The method of claim 1, wherein the high-temperature fiber is pretreated by mechanically-polishing its cleaved end surface.

3. The method of claim 1, wherein the high-temperature fiber is pretreated by fire-polishing its cleaved end surface.

4. The method of claim 3, wherein the cleaved end surface is fire-polished at a temperature above the softening temperature of the high-temperature fiber.

5. The method of claim 1, wherein the high-temperature fiber is formed from silica glass and the low-temperature fiber is formed from a multi-component glass of phosphorus oxide $P_2O_5$, germanium oxide $GeO_2$ or telluride oxide $TeO_2$.

6. The method of claim 5, wherein said silica glass has a softening temperature greater than 1600° C. and said multi-component glass has a softening temperature less than 1000° C., said fibers being heated to a temperature between the softening temperatures of the said silica glass and said multi-component glass.

7. The method of claim 1, wherein the high and low temperature fibers are placed in the end-to-end configuration with a small gap separating the fibers, heated, and pushed together to form the fusion splice.

8. The method of claim 1, wherein the fibers are heated asymmetrically to raise the temperature at the ends of the high-temperature fiber ($T_H$) and the low-temperature fiber ($T_L$) such that $T_{H-soft} > T_H > T_L > T_{L-soft}$ at the gap between the fibers where $T_{L-soft}$ and $T_{H-soft}$ are the softening temperatures of the low and high temperature fibers.

9. The method of claim 8, wherein the fibers are asymmetrically heated by:

Placing a heating element proximate to the high-temperature fiber at a distance $d_o$ from the small gap away from the low-temperature fiber; and Activating the heating element to generate heat.

10. The method of claim 1, wherein the high-temperature fiber is angle-cleaved and the low-temperature-fiber is square-cleaved.

11. The method of claim 10, wherein heating the fibers softens the square-cleaved end surface of the low-temperature fiber such it forms a matched angle to the angle-cleaved end surface of the high-temperature fiber in situ.

12. A method of fusing optical fiber, comprising:

Providing a first optical fiber formed of a silica glass and having a cleaved end surface and a second optical fiber formed of a first low-temperature multi-component glass;

Pretreating the first fiber to smooth the cleaved end surface;

Placing the first and second optical fibers in an end-to-end configuration with a small gap separating the fibers, said first multi-component glass having a softening point temperature that is lower than that of said silica glass;

Asymmetrically heating the fibers to raise the temperature of the first optical fiber ($T_{si}$) and the second optical fiber ($T_{mc}$) such that $T_{si} > T_{mc}$ at the gap between the fibers, $T_{mc} > T_{mc-soft}$ where $T_{mc-soft}$ is the softening temperature of the first multi-component glass, $T_{si} < T_{si-soft}$ where $T_{si-soft}$ is the softening temperature of the silica glass; and Moving the fibers together such that said fibers form thermal diffusion bonds between the first optical fiber and the second optical fiber.

13. The method of claim 12, wherein the high-temperature fiber is pretreated by mechanically-polishing its cleaved end surface.

14. The method of claim 12, wherein the high-temperature fiber is pretreated by fire-polishing its cleaved end surface.

15. The method of claim 13, wherein the cleaved end surface is fire-polished at a temperature above the softening temperature of the high-temperature fiber.

16. The method of claim 12, wherein the first low-temperature multi-component glass comprises a glass network former selected from one of phosphorus oxide $P_2O_5$ or germanium oxide $GeO_2$.

17. The method of claim 12, wherein said second optical fiber is drawn with an outer cladding formed from a second multi-component glass having a softening temperature higher than the first multi-component glass and a glass network that is more compatible with forming strong thermal diffusion bonds with the silica glass.

18. The method of claim 12, wherein the fibers are asymmetrically heated by:

Placing a heating element proximate the first optical fiber at a distance $d_o$ from the small gap separating the fibers; and Activating the heating element to locally heat the first optical fiber, which in turn acts as a heating element to heat the second optical fiber.

19. A method of fusing optical fiber, comprising:

Providing a first optical fiber formed of a silica glass and having an angle-cleaved end surface;

Pretreating the first optical fiber to smooth the angle-cleaved end surface;

Providing a second optical fiber formed of a non-silica glass and having a square-cleaved end surface;

Placing the pair of optical fibers in an end-to-end configuration with a small gap separating the fibers; and Heating the first and second optical fibers at a temperature between the softening temperatures of the silica and non-silica glasses to soften the square-cleaved end surface of the second optical fiber without softening the angle-cleaved end surface of the first optical fiber to form a fused joint.

20. The method of claim 19, wherein the high-temperature fiber is pretreated by mechanically-polishing its cleaved end surface.

21. The method of claim 19, wherein the high-temperature fiber is pretreated by fire-polishing its cleaved end surface.

22. The method of claim 21, wherein the cleaved end surface is fire-polished at a temperature near the softening temperature of the high-temperature fiber.

23. The method of claim 19, wherein heating the fibers softens the second optical fiber's square-cleaved end surface such it forms a matched angle to the first optical fiber's angle-cleaved end surface in situ.

24. The method of claim 19, wherein the fibers are heated asymmetrically to raise the temperature at the ends of the first optical fiber ($T_{si}$) and the second optical fiber ($T_{mc}$) such that $T_{si-soft} > T_{si} > T_{mc} > T_{mc-soft}$ at the gap between the fibers where $T_{si-soft}$ and $T_{mc-soft}$ are the softening temperatures of the silica and non-silica glass, respectively.

25. The method of claim 19, wherein the first optical fiber comprises a core surrounded by a cladding which is angle-cleaved to form a tip, further comprising the step of polishing the tip of the angle-cleaved fiber flat back to at or near its core.

* * * * *